US008541728B1

(12) United States Patent
Xu et al.

(10) Patent No.: US 8,541,728 B1
(45) Date of Patent: Sep. 24, 2013

(54) SIGNAL MONITORING AND CONTROL SYSTEM FOR AN OPTICAL NAVIGATION SENSOR

(75) Inventors: Yansun Xu, Mountian View, CA (US); Steven Sanders, Belmont, CA (US); Jahja Trisnadi, Cupertino, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 272 days.

(21) Appl. No.: 13/171,186

(22) Filed: Jun. 28, 2011

Related U.S. Application Data

(63) Continuation of application No. 12/286,584, filed on Sep. 30, 2008.

(51) Int. Cl.
*G01J 1/32* (2006.01)

(52) U.S. Cl.
USPC ............... 250/205; 250/214 AG; 396/209; 396/210; 375/318; 375/345

(58) Field of Classification Search
USPC ...... 250/203.1; 702/150–153; 345/157–158; 345/173; 382/312; 178/18.09
See application file for complete search history.

(56) References Cited

U.S. PATENT DOCUMENTS

| | | |
|---|---|---|
| 3,922,093 A | 11/1975 | Dandliker et al. |
| 4,225,240 A | 9/1980 | Balasubramanian |
| 4,546,347 A | 10/1985 | Kirsch |
| 4,560,881 A | 12/1985 | Briggs |
| 4,740,675 A | 4/1988 | Brosnan et al. |
| 4,751,380 A | 6/1988 | Victor et al. |
| 4,799,055 A | 1/1989 | Nestler et al. |
| 4,814,553 A | 3/1989 | Joyce |
| 4,920,260 A | 4/1990 | Victor et al. |
| 4,936,683 A | 6/1990 | Purcell |
| 5,052,027 A | 9/1991 | Poklemba et al. |
| 5,086,197 A | 2/1992 | Liou |
| 5,288,993 A | 2/1994 | Bidiville et al. |
| 5,345,527 A | 9/1994 | Lebby et al. |
| 5,391,868 A | 2/1995 | Vampola et al. |
| 5,448,508 A | 9/1995 | Ono et al. |
| 5,473,344 A | 12/1995 | Bacon et al. |

(Continued)

FOREIGN PATENT DOCUMENTS

| | | |
|---|---|---|
| WO | WO9946603 A1 | 9/1999 |
| WO | WO0248853 A1 | 6/2002 |

OTHER PUBLICATIONS

"The Examiner's Grounds for Rejection," from Korean Patent Office for Patent Application No. 10-2006-7026956; Dec. 31, 2007; 4 pages.

(Continued)

*Primary Examiner* — Seung C Sohn

(57) ABSTRACT

A circuit and method are provided to control the strength of signals from an array of photo-detectors in an optical navigation sensor. In one embodiment, the method includes receiving a current signal from an automatic gain control (AGC) photo-detector and generating an AGC signal in response thereto; generating an illumination control signal in response to the AGC signal; and coupling the illumination control signal to an illuminator configured to illuminate at least a portion of an array of photo-detectors with light reflected from a surface to sense displacement of the optical navigation sensor relative to a surface, and adjusting illumination from the illuminator. Other embodiments are also disclosed.

20 Claims, 7 Drawing Sheets

(56) References Cited

U.S. PATENT DOCUMENTS

| | | |
|---|---|---|
| 5,578,813 A | 11/1996 | Allen et al. |
| 5,606,174 A | 2/1997 | Yoshimura et al. |
| 5,627,363 A | 5/1997 | Paxman et al. |
| 5,644,139 A | 7/1997 | Allen et al. |
| 5,703,356 A | 12/1997 | Bidiville et al. |
| 5,729,008 A | 3/1998 | Blalock et al. |
| 5,729,009 A | 3/1998 | Daendliker et al. |
| 5,781,229 A * | 7/1998 | Zediker et al. ............ 250/206.1 |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Daendliker et al. |
| 5,963,197 A | 10/1999 | Bacon et al. |
| 5,994,710 A | 11/1999 | Knee et al. |
| 6,031,218 A | 2/2000 | Piot et al. |
| 6,034,379 A | 3/2000 | Bunte et al. |
| 6,034,760 A | 3/2000 | Rees |
| 6,037,643 A | 3/2000 | Knee |
| 6,057,540 A | 5/2000 | Gordon et al. |
| 6,097,371 A | 8/2000 | Siddiqui et al. |
| 6,137,566 A | 10/2000 | Leonard et al. |
| 6,151,015 A | 11/2000 | Badyal et al. |
| 6,172,354 B1 | 1/2001 | Adan et al. |
| 6,176,143 B1 | 1/2001 | Mo et al. |
| 6,194,695 B1 | 2/2001 | Barrows |
| 6,195,475 B1 | 2/2001 | Beausoleil, Jr. et al. |
| 6,201,572 B1 | 3/2001 | Chou |
| 6,218,659 B1 | 4/2001 | Bidiville et al. |
| 6,222,174 B1 | 4/2001 | Tullis et al. |
| 6,225,617 B1 | 5/2001 | Daendliker et al. |
| 6,226,092 B1 | 5/2001 | De Lega |
| 6,233,368 B1 | 5/2001 | Badyal et al. |
| 6,243,134 B1 | 6/2001 | Beiley |
| 6,255,643 B1 | 7/2001 | Sayag |
| 6,256,016 B1 | 7/2001 | Piot et al. |
| 6,281,881 B1 | 8/2001 | Siddiqui et al. |
| 6,281,882 B1 | 8/2001 | Gordon et al. |
| 6,304,330 B1 | 10/2001 | Millerd et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,608,585 B2 | 8/2003 | Benitz |
| 6,618,038 B1 | 9/2003 | Bohn |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,707,027 B2 | 3/2004 | Liess et al. |
| 6,710,855 B2 | 3/2004 | Shiraishi |
| 6,737,636 B2 | 5/2004 | Dietz et al. |
| 6,741,335 B2 * | 5/2004 | Kinrot et al. ..................... 356/28 |
| 6,753,851 B2 | 6/2004 | Choi et al. |
| 6,756,980 B2 | 6/2004 | Hayashi |
| 6,774,351 B2 | 8/2004 | Black |
| 6,774,915 B2 | 8/2004 | Rensberger |
| 6,778,571 B2 | 8/2004 | Vaughan |
| 6,795,056 B2 | 9/2004 | Norskog et al. |
| 6,809,403 B2 | 10/2004 | Gee |
| 6,809,723 B2 | 10/2004 | Davis |
| 6,819,314 B2 | 11/2004 | Black |
| 6,823,077 B2 | 11/2004 | Dietz et al. |
| 6,825,998 B2 | 11/2004 | Yoshida |
| 6,869,185 B2 | 3/2005 | Kaminsky et al. |
| 6,947,459 B2 | 9/2005 | Kurtz et al. |
| 6,950,094 B2 | 9/2005 | Gordon et al. |
| 6,951,540 B2 | 10/2005 | Ebbini et al. |
| 6,967,321 B2 | 11/2005 | Leong et al. |
| 6,977,645 B2 | 12/2005 | Brosnan |
| 7,019,733 B2 | 3/2006 | Koay |
| 7,042,575 B2 | 5/2006 | Carlisle et al. |
| 7,045,763 B2 | 5/2006 | Ballard |
| 7,049,578 B2 | 5/2006 | Wada et al. |
| 7,098,894 B2 | 8/2006 | Yang et al. |
| 7,119,323 B1 | 10/2006 | Brosnan et al. |
| 7,126,585 B2 | 10/2006 | Davis et al. |
| 7,138,620 B2 | 11/2006 | Trisnadi et al. |
| 7,148,078 B2 | 12/2006 | Moyer et al. |
| 7,161,582 B2 | 1/2007 | Bathiche et al. |
| 7,161,682 B2 | 1/2007 | Xie et al. |
| 7,189,985 B2 | 3/2007 | Xie et al. |
| 7,205,521 B2 | 4/2007 | Gruhlke et al. |
| 7,221,356 B2 * | 5/2007 | Oliver et al. ................... 345/166 |
| 7,227,531 B2 | 6/2007 | Lutian |
| 7,236,239 B2 | 6/2007 | Hase |
| 7,247,832 B2 | 7/2007 | Webb |
| 7,248,345 B2 | 7/2007 | Todoroff et al. |
| 7,250,893 B2 | 7/2007 | Todoroff et al. |
| 7,253,837 B2 | 8/2007 | Henderson et al. |
| 7,268,341 B2 | 9/2007 | Lehoty et al. |
| 7,279,668 B2 | 10/2007 | Misek |
| 7,280,140 B2 | 10/2007 | Henderson |
| 7,285,766 B2 | 10/2007 | Carlisle et al. |
| 7,292,232 B2 | 11/2007 | Ranta et al. |
| 7,297,912 B1 | 11/2007 | Todoroff et al. |
| 7,298,460 B2 | 11/2007 | Xu et al. |
| 7,321,359 B2 | 1/2008 | Xie et al. |
| 7,421,213 B2 | 9/2008 | Harms et al. |
| 7,439,954 B2 | 10/2008 | Theytaz et al. |
| 7,443,427 B2 | 10/2008 | Takayanagi |
| 7,460,979 B2 | 12/2008 | Buckner |
| 7,492,351 B2 | 2/2009 | VanWiggeren et al. |
| 7,505,033 B2 | 3/2009 | Guo et al. |
| 7,515,280 B2 | 4/2009 | Emtman et al. |
| 2002/0093487 A1 | 7/2002 | Rosenberg |
| 2003/0058506 A1 | 3/2003 | Green et al. |
| 2005/0083303 A1 | 4/2005 | Schroeder et al. |
| 2005/0109961 A1 | 5/2005 | Bittner |
| 2005/0156915 A1 | 7/2005 | Fisher |
| 2005/0228838 A1 | 10/2005 | Stetson et al. |
| 2005/0258346 A1 | 11/2005 | Lehoty et al. |
| 2005/0259078 A1 | 11/2005 | Roxlo et al. |
| 2005/0259097 A1 | 11/2005 | Lehoty et al. |
| 2005/0285960 A1 | 12/2005 | Purcell et al. |
| 2006/0028442 A1 | 2/2006 | Bynum et al. |
| 2006/0118743 A1 | 6/2006 | Lang |
| 2006/0187209 A1 | 8/2006 | Lai et al. |
| 2006/0279545 A1 | 12/2006 | Lan et al. |
| 2007/0057157 A1 | 3/2007 | Trisnadi et al. |
| 2007/0138377 A1 | 6/2007 | Zarem |
| 2007/0143383 A1 | 6/2007 | Xu et al. |

OTHER PUBLICATIONS

U.S. Appl. No. 11/123,326: Optical Position Sensing Device including Interlaced Groups of Photosensitive Elements, Lehoty et al.; 51 pages.

U.S. Appl. No. 11/123,500: "Optical positioning device using different combinations of interlaced photosensitive elements," Lehoty et al.; 49 pages.

U.S. Appl. No. 11/123,525: "Optical positioning device with multi-row detector array," Roxlo et al.; 51 pages.

U.S. Appl. No. 11/123,527: "Optical positioning device resistant to speckle fading," LeHoty et al.; 52 pages.

U.S. Appl. No. 11/128,988: "Speckle sizing and sensor dimensions in optical positioning device;" Carlisle et al.; 27 pages.

U.S. Appl. No. 11/129,967: "Optical positioning device having shaped illumination," Carlisle et al.; 27 pages.

U.S. Appl. No. 11/261,316: "Two-Dimensional Motion Sensor," Trisnadi et al.; 55 pages.

U.S. Appl. No. 11/313,133: "Speckle navigation system;" Spurlock et al.; filed on Dec. 20, 2005; 25 pages.

U.S. Appl. No. 11/582,776: "Two-Dimensional Motion Sensor," Trisnadi et al.; 54 pages.

U.S. Appl. No. 12/286,584: "Signal Monitoring and Control System for an Optical Navigation Sensor," Yansun Xu et al., filed on Sep. 30, 2008; 31 pages.

1st Office Action for China Patent Application No. 200580022643.5 dated Jan. 4, 2008; 14 pages.

1st Office Action for Korean Patent Application No. 10-2006-7026821 dated Apr. 28, 2008; 2 pages.

International Search Report of the International Searching Authority dated Feb. 22, 2008 for International Application No. PCT/US06/47723; 2 pages.

International Search Report of the International Searching Authority dated Feb. 25, 2008 for International Application No. PCT/US06/47802; 2 pages.

International Search Report of the International Searching Authority for Application No. PCT/US2005/017375 dated Oct. 2, 2006; 2 pages.

International Search Report of the International Searching Authority for Application No. PCT/US2005/017462 dated Sep. 14, 2006; 4 pages.

International Search Report of the International Searching Authority for International Application No. PCT/US2005/017459 dated Sep. 26, 2006; 2 pages.

International Search Report of the International Searching Authority for International Application No. PCT/US2005/017461 dated Nov. 23, 2006; 3 pages.

International Written Opinion of the International Searching Authority dated Feb. 25, 2008 for International Application No. PCT/US06/47802; 4 pages.

International Written Opinion of the International Searching Authority for International Application No. PCT/US2007/007062 dated Nov. 21, 2008; 5 pages.

R.E. Kalman, "A New Approach to Linear Filtering and Prediction Problems," Transactions of the ASME-Journal of Basic Engineering, Research Institute for Advanced Study; Baltimore, MD, Mar. 1960; 12 pages.

Search Report of the International Searching Authority for International Application No. PCT/US2007/007062 dated Nov. 21, 2008; 2 pages.

The Written Opinion of the International Searching Authority for International Application No. PCT/US2005/017459 dated Sep. 26, 2006; 2 pages.

USPTO Advisory Action for U.S. Appl. No. 11/432,987 dated Jul. 22, 2009; 3 pages.

USPTO Final Rejection for U.S. Appl. No. 11/129,967 dated May 31, 2007; 8 pages.

USPTO Final Rejection for U.S. Appl. No. 11/223,389 dated Mar. 5, 2007; 5 pages.

USPTO Final Rejection for U.S. Appl. No. 11/271,039 dated Mar. 16, 2007; 8 pages.

USPTO Final Rejection for U.S. Appl. No. 11/292,470 dated Sep. 19, 2007; 10 pages.

USPTO Final Rejection for U.S. Appl. No. 11/303,365 dated Jan. 2, 2008; 11 pages.

USPTO Final Rejection for U.S. Appl. No. 11/432,987 dated May 6, 2009; 8 pages.

USPTO Final Rejection for U.S. Appl. No. 11/432,987 dated May 13, 2008; 8 pages.

USPTO Miscellaneous Action for U.S. Appl. No. 11/123,326 dated Jun. 8, 2005; 1 page.

USPTO Miscellaneous Action for U.S. Appl. No. 11/123,500 dated Jun. 8, 2005; 1 page.

USPTO Miscellaneous Action for U.S. Appl. No. 11/123,525 dated Jun. 10, 2005; 1 page.

USPTO Miscellaneous Action with SSP for U.S. Appl. No. 11/313,133 dated Dec. 20, 2006; 1 page.

USPTO Non-Final Rejection for U.S. Appl. No. 11/123,326 dated Mar. 21, 2007; 6 pages.

USPTO Non-Final Rejection for U.S. Appl. No. 11/123,500 dated Apr. 11, 2008; 17 pages.

USPTO Non-Final Rejection for U.S. Appl. No. 11/123,525 dated Apr. 14, 2008; 20 pages.

USPTO Non-Final Rejection for U.S. Appl. No. 11/123,527 dated Apr. 9, 2008; 18 pages.

USPTO Non-Final Rejection for U.S. Appl. No. 11/124,858 dated Feb. 25, 2009; 23 pages.

USPTO Non-Final Rejection for U.S. Appl. No. 11/124,858 dated Oct. 8, 2008; 17 pages.

USPTO Non-Final Rejection for U.S. Appl. No. 11/129,967 dated Dec. 6, 2006; 8 pages.

USPTO Non-Final Rejection for U.S. Appl. No. 11/223,389 dated Jun. 26, 2006; 12 pages.

USPTO Non-Final Rejection for U.S. Appl. No. 11/261,316 dated Jun. 6, 2006; 6 pages.

USPTO Non-Final Rejection for U.S. Appl. No. 11/271,039 dated Aug. 8, 2006; 7 pages.

USPTO Non-Final Rejection for U.S. Appl. No. 11/292,470 dated Jan. 17, 2007; 12 pages.

USPTO Non-Final Rejection for U.S. Appl. No. 11/303,363 dated Apr. 16, 2009; 4 pages.

USPTO Non-Final Rejection for U.S. Appl. No. 11/303,365 dated Mar. 5, 2010; 6 pages.

USPTO Non-Final Rejection for U.S. Appl. No. 11/303,365 dated Apr. 2, 2007; 13 pages.

USPTO Non-Final Rejection for U.S. Appl. No. 11/313,133 dated Jan. 5, 2009; 7 pages.

USPTO Non-Final Rejection for U.S. Appl. No. 11/313,133 dated Jul. 7, 2009; 8 pages.

USPTO Non-Final Rejection for U.S. Appl. No. 11/324,424 dated Apr. 12, 2007; 6 pages.

USPTO Non-Final Rejection for U.S. Appl. No. 11/432,987 dated Sep. 3, 2009; 10 pages.

USPTO Non-Final Rejection for U.S. Appl. No. 11/432,987 dated Oct. 20, 2008; 10 pages.

USPTO Non-Final Rejection for U.S. Appl. No. 11/432,987 dated Nov. 5, 2007; 7 pages.

USPTO Non-Final Rejection for U.S. Appl. No. 11/582,776 dated Sep. 10, 2007; 8 pages.

USPTO Non-Final Rejection for U.S. Appl. No. 12/286,584 dated Jun. 12, 2009; 7 pages.

USPTO Notice of Allowance for U.S. Appl. No. 11/123,326 dated Jul. 9, 2007; 4 pages.

USPTO Notice of Allowance for U.S. Appl. No. 11/124,858 dated Sep. 16, 2009; 9 pages.

USPTO Notice of Allowance for U.S. Appl. No. 11/128,988 dated Feb. 2, 2006; 7 pages.

USPTO Notice of Allowance for U.S. Appl. No. 11/129,967 dated Aug. 6, 2007; 4 pages.

USPTO Notice of Allowance for U.S. Appl. No. 11/223,389 dated Apr. 26, 2007; 7 pages.

USPTO Notice of Allowance for U.S. Appl. No. 11/261,316 dated Aug. 23, 2006; 6 pages.

USPTO Notice of Allowance for U.S. Appl. No. 11/268,898, dated Apr. 19, 2007; 9 pages.

USPTO Notice of Allowance for U.S. Appl. No. 11/271,039 dated Jun. 5, 2007; 7 pages.

USPTO Notice of Allowance for U.S. Appl. No. 11/292,470 dated May 30, 2008; 7 pages.

USPTO Notice of Allowance for U.S. Appl. No. 11/303,363 dated Jan. 19, 2010; 5 pages.

USPTO Notice of Allowance for U.S. Appl. No. 11/303,363 dated Sep. 17, 2009; 4 pages.

USPTO Notice of Allowance for U.S. Appl. No. 11/303,363 dated Dec. 29, 2009; 2 pages.

USPTO Notice of Allowance for U.S. Appl. No. 11/303,365 dated Jan. 21, 2011; 6 pages.

USPTO Notice of Allowance for U.S. Appl. No. 11/303,365 dated May 12, 2011; 7 pages.

USPTO Notice of Allowance for U.S. Appl. No. 11/303,365 dated Aug. 19, 2010; 6 pages.

USPTO Notice of Allowance for U.S. Appl. No. 11/313,133 dated Dec. 23, 2009; 4 pages.

USPTO Notice of Allowance for U.S. Appl. No. 11/324,424 dated Oct. 2, 2007; 4 pages.
USPTO Notice of Allowance for U.S. Appl. No. 11/389,903 dated Sep. 19, 2007; 7 pages.
USPTO Notice of Allowance for U.S. Appl. No. 11/432,987 dated Feb. 4, 2010; 7 pages.
USPTO Notice of Allowance for U.S. Appl. No. 11/582,776 dated May 16, 2008; 6 pages.
USPTO Notice of Allowance for U.S. Appl. No. 12/286,584 dated Mar. 18, 2011; 9 pages.
USPTO Notice of Allowance for U.S. Appl. No. 12/286,584 dated Jun. 15, 2012; 9 pages.
USPTO Notice of Allowance for U.S. Appl. No. 12/286,584 dated Nov. 13, 2009; 7 pages.
Written Opinion of the International Searching Authority dated Feb. 22, 2008 for International Application No. PCT/US06/47723; 4 pages.
Written Opinion of the International Searching Authority for Application No. PCT/US2005/017462 dated Sep. 14, 2006; 6 pages.

* cited by examiner

SIGNAL MONITORING AND CONTROL SYSTEM FOR AN OPTICAL NAVIGATION SENSOR

CROSS-REFERENCE TO RELATED APPLICATIONS

This application is a continuation of U.S. application Ser. No. 12/286,584, filed Sep. 30, 2008.

TECHNICAL FIELD

The present disclosure relates generally to a user interface device, and more particularly to a user interface device including an optical navigation sensor and a guard-sensor to enable the optical navigation sensor.

BACKGROUND

Optical navigation sensors are commonly used in devices, such as an optical computer mouse, trackball or touch pad, for interfacing with personal computers and workstations. One technology used for optical navigation sensors relies on sensing light reflected from a surface using an array of photosensitive elements or detectors, such as photodiodes. Generally, outputs of the individual elements in the array are combined using signal processing circuitry to detect and track motion of a pattern or image in the reflected light and from that tracking to derive the motion of the surface relative to the array.

The optical navigation sensor described above will receive very weak signals when tracking on dark surfaces, and is subject to signal saturation when tracking on light surfaces. When this happens, the estimation of displacements become erratic and unreliable, hence affecting the overall performance of the optical navigation sensor.

SUMMARY

A gain control circuit is used to control strength of signals from an array of photo-detectors (PDs) in an optical navigation sensor. Generally, the circuit includes a number of transimpedance-amplifiers (TIAs) each comprising an input coupled to at least one of the PDs in the array to receive a current signal therefrom and generate an automatic gain control (AGC) signal in response thereto, and a controller coupled to outputs of the number of TIAs to receive the AGC signal therefrom. The controller includes logic to execute a signal gain adjustment algorithm and to adjust a gain of a signal processor coupled to the array of PDs in response to the AGC signal.

BRIEF DESCRIPTION OF THE DRAWINGS

These and various other features of the control system and method will be apparent upon reading of the following detailed description in conjunction with the accompanying drawings and the appended claims provided below, where:

DETAILED DESCRIPTION

Figure 1:
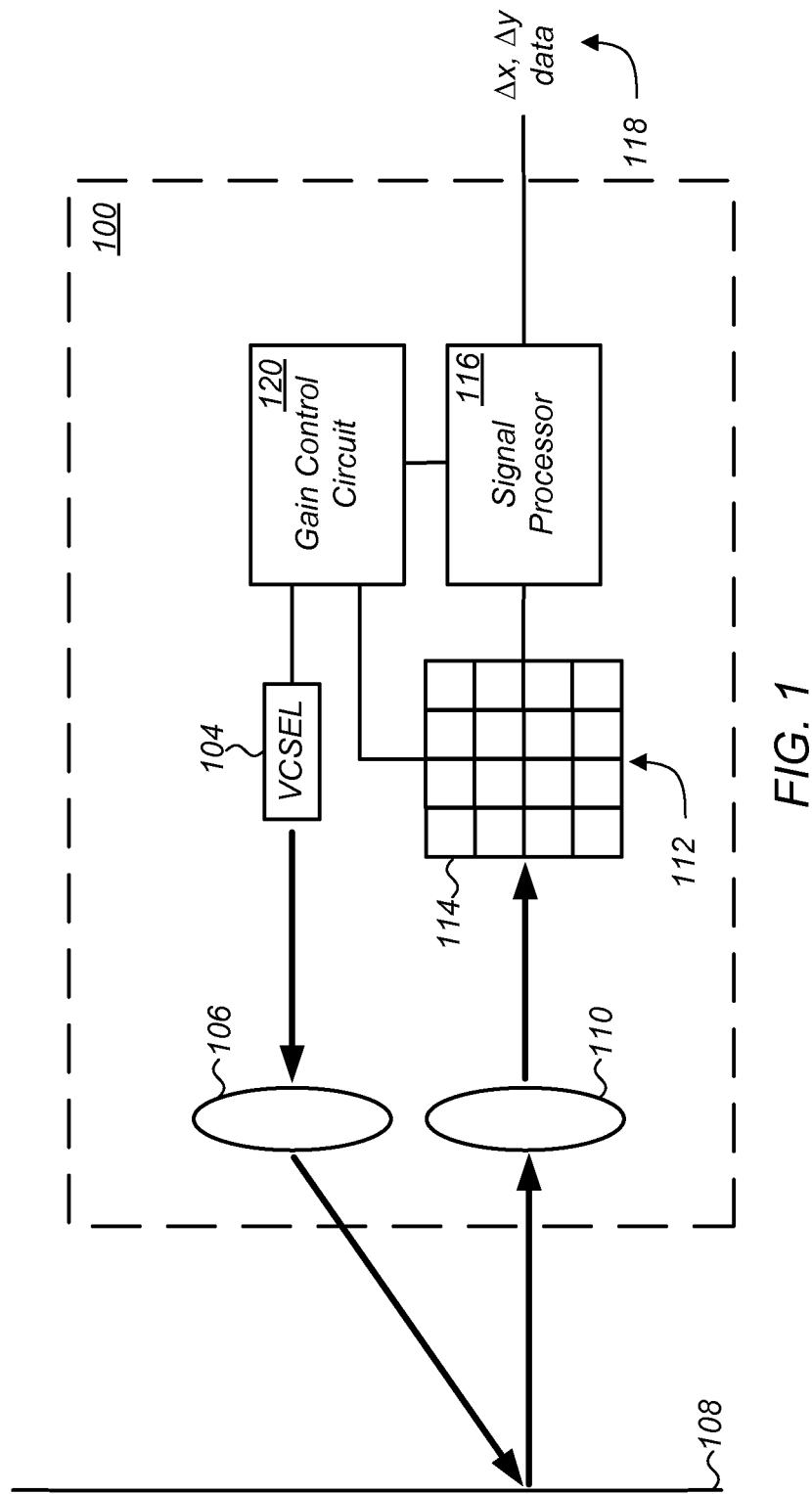
FIG. 1 is a functional block diagram of an optical navigation sensor including a gain control circuit.

The present disclosure is directed generally to optical navigation sensors and more particularly to a control circuit and method for use with an optical navigation sensor included in an input device to sense displacement of the device relative to a surface.

Optical navigation sensors, for example, an optical computer mouse, trackballs, and the like, may input data into and interface with personal computers and workstations. For purposes of clarity, many of the details of optical navigation sensors in general and optical sensors for optical devices, such as an optical computer mouse, trackball or touch pad, in particular that are widely known and are not relevant to the present control system and method have been omitted from the following description. Optical navigation sensors are described, for example, in commonly assigned U.S. Pat. No. 7,138,620, entitled, "Two-Dimensional Motion Sensor," by Jahja Trisnadi et al., issued on Nov. 21, 2006.

A gain control circuit and method of the present disclosure monitors and controls strength of signals from an array in an optical navigation sensor used to sense movement of the optical navigation sensor, or device in which it is included, relative to a surface. The array, which comprises multiple photosensitive elements, such as photodiodes (PDs), determines a direction and magnitude of movement by detecting changes in a pattern of light reflected from the surface. Generally, the circuit includes a number of transimpedance-amplifiers (TIAs) each comprising an input coupled to at least one PD in the array to receive a current signal therefrom and generate an automatic gain control (AGC) signal in response thereto. A controller coupled to outputs of the TIAs adjusts or modulates gain in a signal processor of optical navigation sensor coupled to the array and/or modulates an intensity of illumination of the surface to control strength of signals from the array.

The signal processing method of the present disclosure is applicable to both speckle and non-speckle based optical navigation sensors comprising either one or more one-dimensional (1D) arrays or one or more two-dimensional (2D) arrays of PDs. The 2D array may be either a periodic, 2D comb-array, which includes a number of regularly spaced photosensitive elements comprising 1D or 2D periodicity, a quasi-periodic 2D array (such as one comprising Penrose tiling), or a non-periodic 2D array, which has a regular pattern but doesn't include periodicities.

In an embodiment, the optical navigation sensor is a speckle-based system, which senses movement based on displacement of a complex intensity distribution pattern of light, known as speckle. Speckle is the complex interference pattern generated by scattering of coherent light off a rough surface and detected by a photosensitive element, such as a photodiode, with a finite angular field-of-view (or numerical aperture). However, it will be appreciated by those skilled in the art that the method and circuit of the present disclosure is not limited to speckle-based systems, and can be used with other types of illumination, including coherent and non-coherent light sources, and images in which the signal captured by the optical navigation sensor comprises a strong spatial frequency matching a period or spacing of PDs in the array.

A functional block diagram of an optical navigation sensor including a gain control circuit is shown in FIG. 1. Referring to FIG. 1, an optical navigation sensor 100 generally includes a light source or illuminator 104, such as a Vertical-cavity surface-emitting laser (VCSEL), and illumination optics 106 to illuminate a portion of a surface 108, imaging optics 110 to map or image a pattern in light reflected by the surface, and an array 112 to sense or detect change in the pattern. Although shown in the figure as ellipses resembling a lens, the illumination optics 106 and imaging optics 110 can include any number of lenses, prisms, and reflectors to illuminate the surface 108 or the array 112. The array 112 includes one or more two-dimensional (2D) arrays each comprising a number of photosensitive elements, such as photodiodes (PD) 114, on which light reflected from the surface 108 is received. Current signals from PDs 114 in the array 112 are combined by a signal processor 116 to provide measurements or data (Åx, Åy data 118) on the magnitude and direction of displacement of the optical navigation sensor 100 or an input device, such as an optical computer mouse, in which it is included relative to the surface 108. The optical navigation sensor 100 further includes a gain control circuit 120 for controlling the signal processor 116 and/or the illuminator 104 to automatically control strength of signals originating from the array 112.

Figure 2:
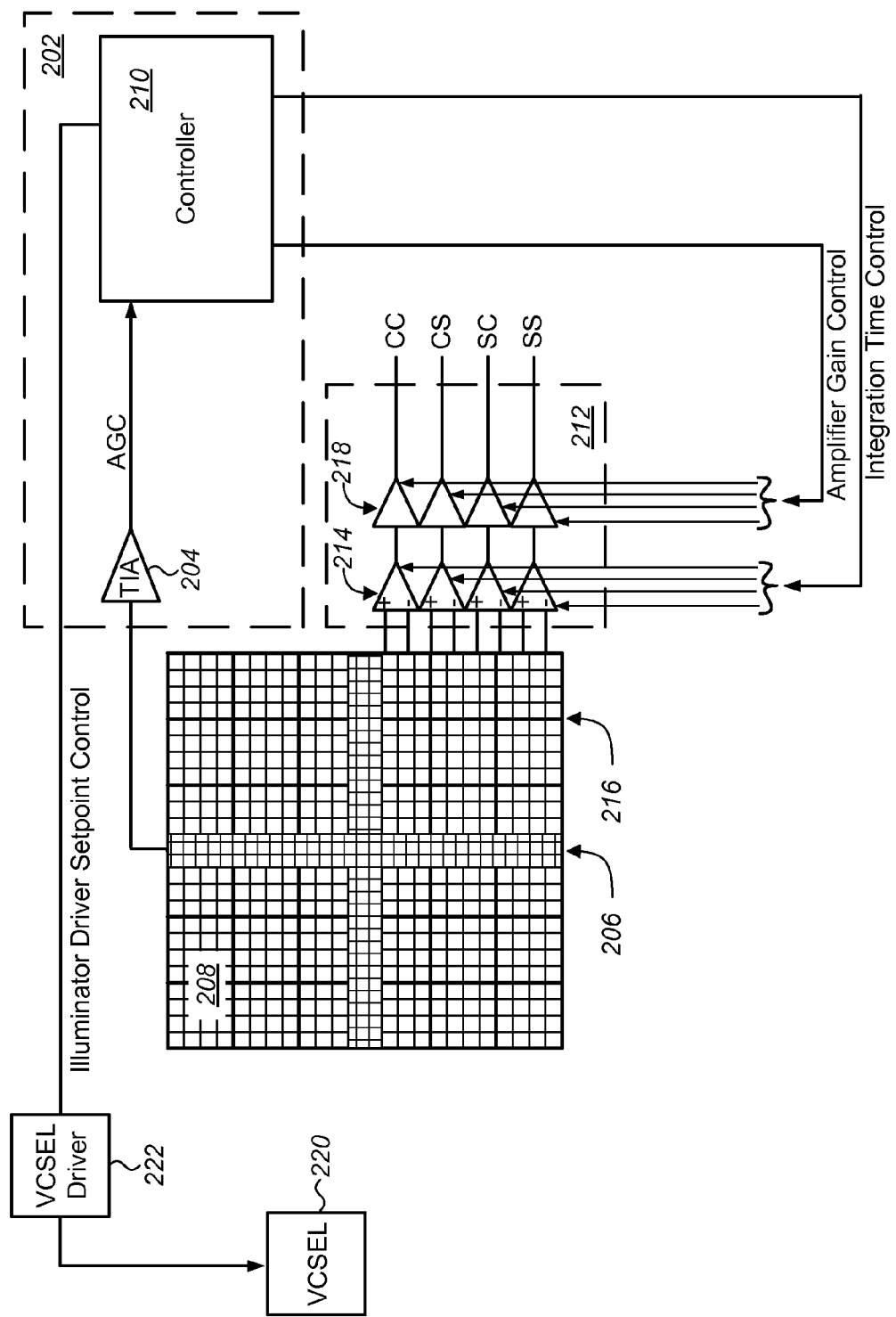
FIG. 2 is a schematic block diagram illustrating a gain control loop in an optical navigation sensor.
Figure 3A:
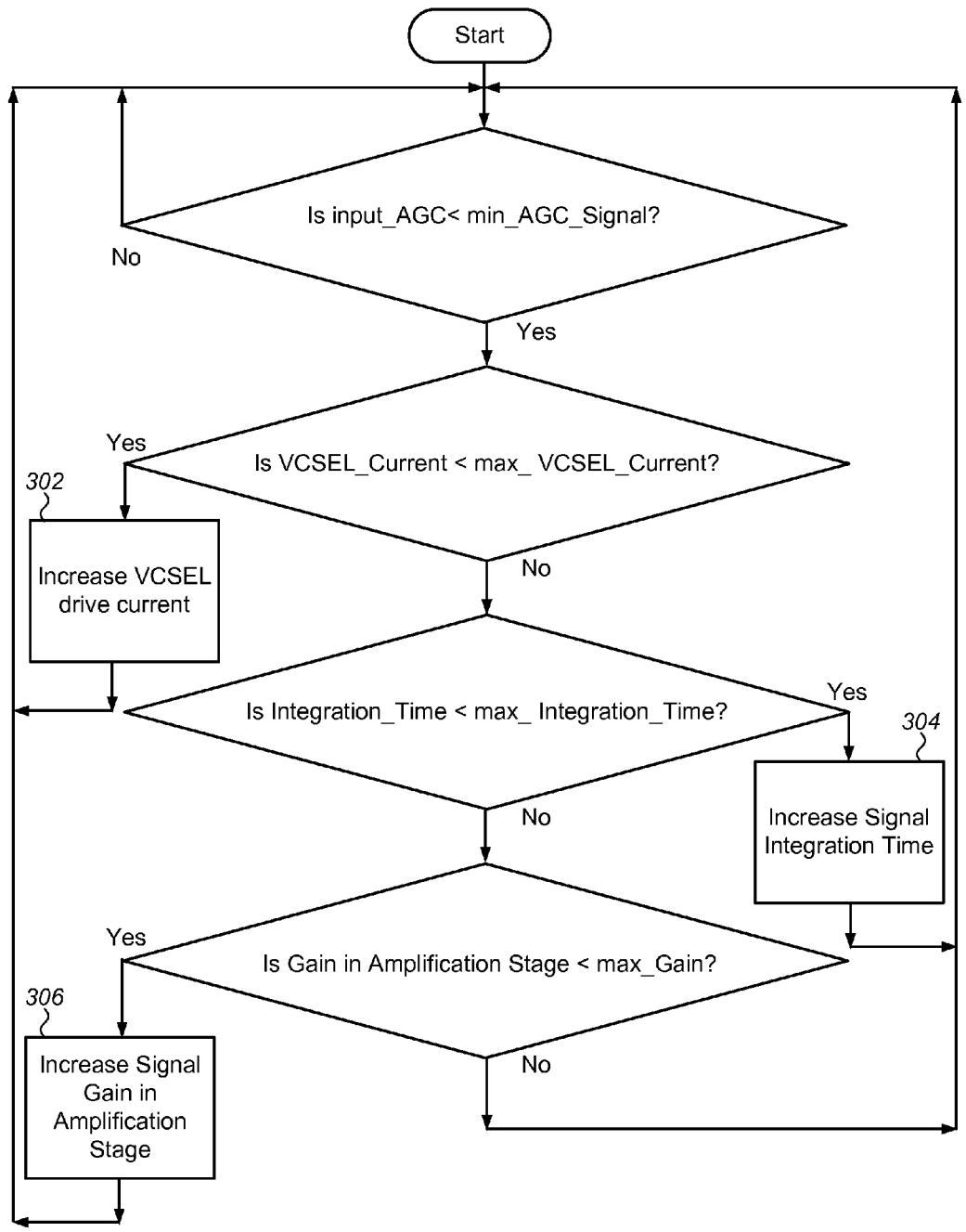
FIGS. 3A and 3B illustrate embodiments of a signal gain adjustment algorithm.
Figure 3B:
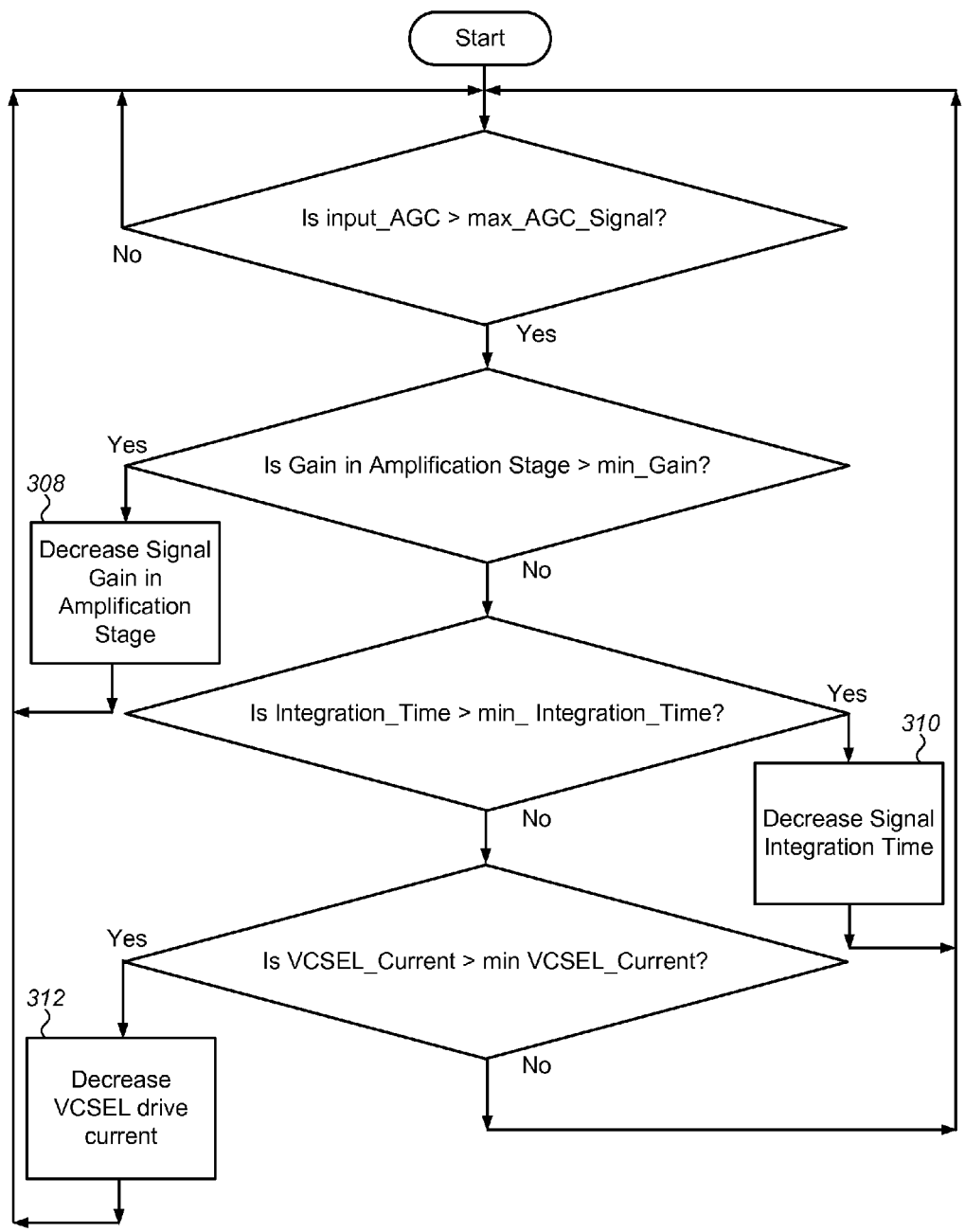

The gain control circuit will now be described in detail with reference to FIGS. 2 and 3, where FIG. 2 illustrates a gain control loop of the gain control circuit in an optical navigation sensor, and FIGS. 3A and 3B illustrate methods of generating an automatic gain control (AGC) signal according to embodiments.

Referring to FIG. 2, in one embodiment the gain control circuit 202 includes one or more current-to-voltage converters, such as a single-ended, transimpedance-amplifier (TIA 204) to receive a current signal from a number of PDs 206 in an array 208 and generate an AGC signal that is coupled to a controller 210 in the gain control circuit. Each of the TIAs 204 is directly coupled to PDs 206 extending across the array 208 to substantially eliminate errors that can arise when monitoring signals originate from PD located outside a contiguous area of the array.

The AGC signal output by the TIA 204 is an output voltage signal given by the expression $AGC = g \cdot I_{IN}$, where g is a predetermined gain having units in volts/ampere, and $I_{IN}$ is the current signal received from the PDs 206.

The controller 210 includes computer circuitry or logic to execute a signal gain adjustment algorithm and to adjust a gain in a signal processor 212 coupled to the array 208 in response to the AGC signal. Generally, as in the embodiment shown, the signal processor 212 includes a number of differential transimpedance amplifiers (DIFF-TIAs 214) each comprising inputs coupled to number of PDs 216 in the array 208 to receive current signals therefrom and output a voltage signal ($V_{OUT}$) generated in response to a difference between the received current signals. $V_{OUT}$ is given by the expression $V_{OUT} = g \cdot (I_{IN+} - I_{IN-})$, where g is a predetermined gain having units in volts/ampere, and $I_{IN+}$ is the current applied to a non-inverting input and $I_{IN-}$ is the current applied to an inverting input. The signal processor 212 also includes one or more amplification stages 218 following the DIFF-TIAs 214 to amplify the voltage signals generated by the DIFF-TIAs and output quasi-sinusoidal signals or waveforms (CC, CS, SC, SS), which are further processed in the signal processor to provide data on the magnitude and direction of displacement of the optical navigation sensor relative to the surface. Where the amplification stages 218 include single ended amplifiers, as shown, the output signal ($V_{SIG\_OUT}$) can be expressed as follows: $V_{SIG\_OUT} = G \cdot V_{IN}$, where G is a predetermined unitless gain of the amplifier, and $V_{IN}$ is the input voltage received from the DIFF-TIAs 214. In another embodiment (not shown), the amplification stages 218 can include differential amplifiers having a second input coupled to a predetermined reference or offset voltage. In this embodiment, the output signal is expressed as $V_{SIG\_OUT} = G \cdot (V_{IN1} - V_{IN2})$ where $V_{IN1}$ is the voltage applied to one of the inputs and $V_{IN2}$ to another.

In one version of this embodiment, the controller 210 is configured to output an integration time control signal to adjust or modulate an integration time over which the DIFF-TIAs 214 integrate the received current signals to generate the voltage signals, thereby adjusting gain in the signal processor 212. If the AGC signal is too weak, below a specified or predetermined minimum, the controller 210 executing the signal gain adjustment algorithm operates to increase the time over which the DIFF-TIAs 214 integrate the received current signals, thereby increasing gain in the signal processor 212 and reducing if not eliminating errors in the displacement data. Conversely, if the AGC signal is too strong or exceeds a specified or predetermined maximum, the controller 210 decreases the time over which the DIFF-TIAs 214 integrate the received current signals, thereby avoiding errors in the displacement data that can result from saturating amplifiers in the signal processor 212.

Optionally or additionally, where the signal processor 212 further includes one or more amplification stages 218 following the DIFF-TIAs 214, the controller 210 is configured to output an amplification gain control signal to adjust or modulate gain of the amplification stages. If the AGC signal is below the predetermined minimum the controller 210, executing the signal gain adjustment algorithm operates to increase gain in the amplification stages 218. If the AGC signal exceeds the predetermined maximum, the controller 210 decreases gain in the amplification stages 218.

In certain embodiments, the controller 210 can be configured to output an illuminator driver setpoint control signal to adjust or modulate illumination from an illuminator (VCSEL 220). In particular, the illuminator driver setpoint control signal is coupled to a driver (VCSEL driver 222) used to power the illuminator (VCSEL 220). The controller 210 executes the signal gain adjustment algorithm and operates the VCSEL driver 222 to increase electrical power applied to the illuminator (VCSEL 220), or to increase a duty-cycle of the VCSEL driver 222 if the AGC signal is below the predetermined minimum and to decrease the applied power or duty-cycle if the AGC signal exceeds the predetermined maximum.

Although the controller 210 and the signal gain adjustment algorithm executed therein is described above as controlling a single parameter, i.e., an integration time, amplification stage gain or illumination intensity, it will be appreciated that the controller 210 and algorithm can be operated to simultaneously or sequentially modulate one or more of these parameters to control the strength of signals from the array 208. For example, in certain embodiments, such as those used in a wireless computer mouse, the controller 210 and algorithm can be configured to decrease power to the illuminator (VCSEL 220) or duty cycle of the VCSEL driver 222 if the AGC signal exceeds the predetermined maximum, thereby reducing power consumption. In the same embodiment, the controller 210 and algorithm can be configured to increase amplifier gain if the AGC signal is below a predetermined minimum, thereby increasing the dynamic range of a signal out of the array 208 while minimizing an increase in power consumption.

An aspect of the signal gain adjustment algorithm is the order in which adjustments to the illuminator power (or duty cycle), integration time and amplifier gain are made. An embodiment of the signal gain adjustment algorithm is illustrated in FIGS. 3A and 3B, where FIG. 3A is a flowchart illustrating increase of signal strength and where FIG. 3B is a flowchart illustrating decrease of signal strength. Referring to FIG. 3A, the order in the algorithm of adjustments used to increase signal is to adjust illuminator power first (block 302), then integration time (block 304), then amplifier gain (block 306). Illuminator power can be increased by increasing the duty-cycle or fraction of time in a given period in which power is applied to the illuminator. The amplifier gain can be increased by increasing a gain of one or more individual amplifiers or by switching one or more amplifiers into a chain of amplifiers in the amplification stage. The reverse of this order is used to decrease signal strength, thereby achieving an optimized signal-to-noise-ratio (SNR). Referring to FIG. 3B, the order of adjustments made in the algorithm to decrease signal is to adjust amplifier gain first (block 308), then integration time (block 310), then illuminator power (block 312).

In another embodiment of signal gain adjustment algorithm (not shown), the order of adjustments can be selected to reduce power consumption. In particular, to increase signal strength the order of adjustment can be to first adjust illuminator power, then amplifier gain and then integration time (i.e., VCSEL duty-cycle). Similarly, to the embodiment described above, a reverse order can be used to decrease signal. The order of adjustments used to decrease signal strength, while reducing power consumption and maintaining reasonable SNR, is to adjust integration time (i.e. VCSEL duty-cycle), then amplifier gain and finally illuminator power.

Figure 4:
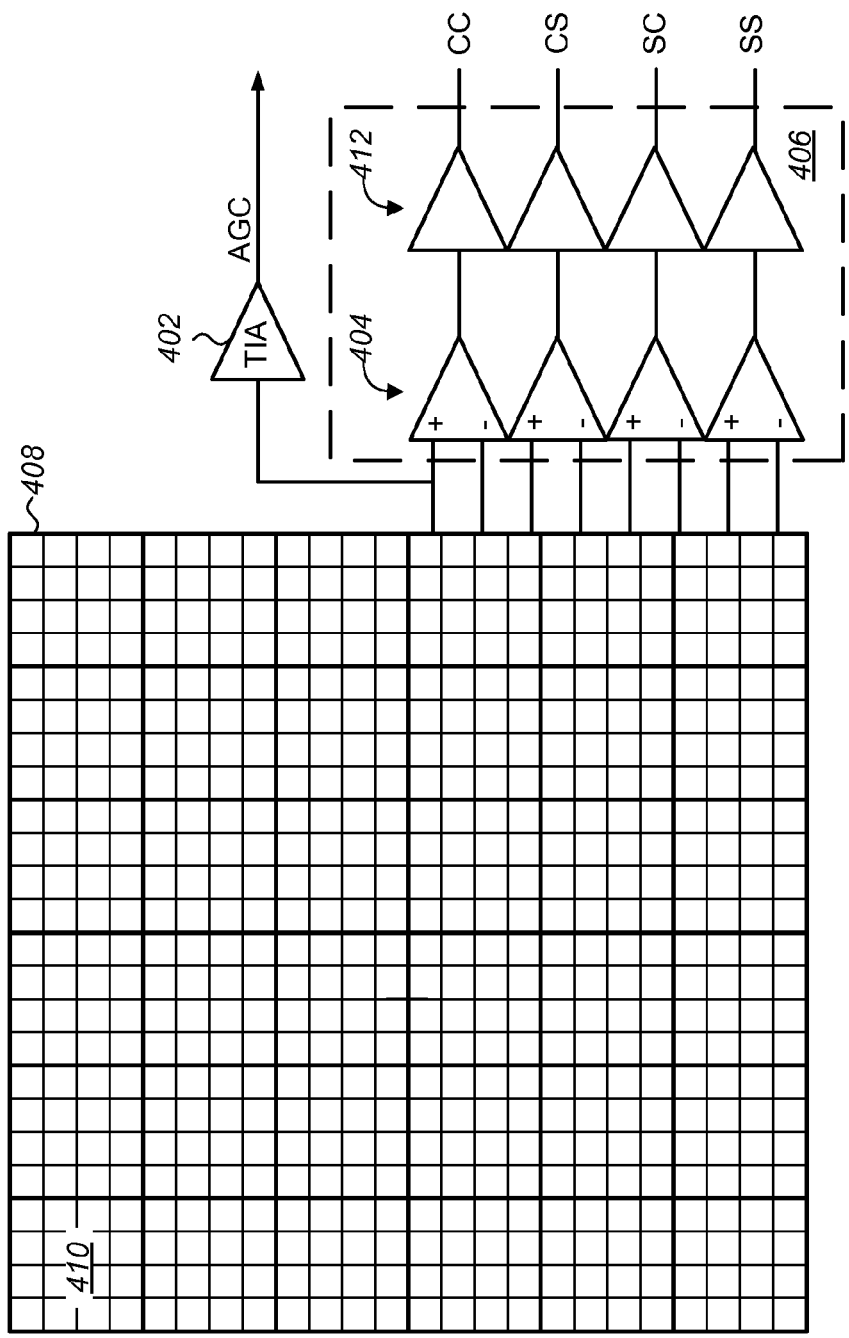
FIG. 4 is a schematic block diagram illustrating coupling of a transimpedance-amplifier (TIA) of the gain control circuit to an array in an optical navigation sensor.

In other embodiments, the TIAs of the gain control circuit can be coupled in parallel with the DIFF-TIAs of the signal processor to shared PDs in the array. By shared PDs, it is meant PDs that are coupled directly to TIAs in the gain control circuit and are coupled to DIFF-TIAs in the signal processor. In one embodiment of this version, shown in the FIG. 4, each of the single-ended TIAs 402 in the gain control circuit is coupled to an input of one of the DIFF-TIAs 404 in the signal processor 406 to split off and route from the PDs 408 in the array 410 to the TIA. The TIA converts the current signal to a voltage to generate the AGC signal that is then coupled to a controller (not shown in this figure), which executes a signal gain adjustment algorithm and operates to adjust or modulate the integration time of the DIFF-TIAs, gain of an amplification stage 412, and/or intensity of illumination from an illuminator (not shown in this figure).

Figure 5:
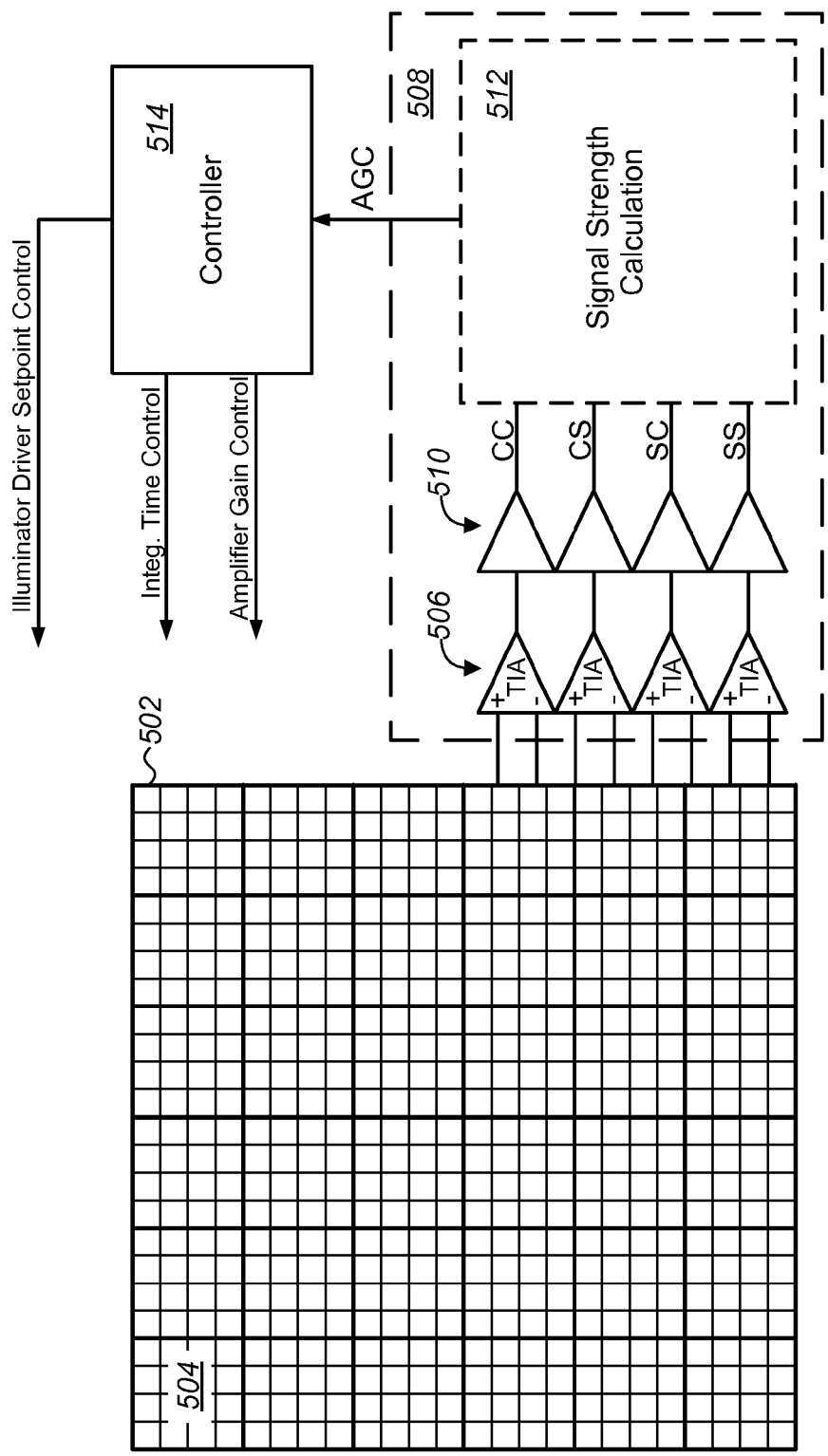
FIG. 5 is a schematic block diagram of an array, signal processor and gain control circuit receiving an automatic gain control signal (AGC) from a signal strength algorithm executed in the signal processor.

In another embodiment, shown in FIG. 5, the AGC signal is derived from DIFF-TIAs in the signal processor. Referring to FIG. 5, current signals from PDs 502 in the array 504 are converted to voltage signals by DIFF-TIAs 506 in the signal processor 508. The voltage signals are amplified in amplification stage 510 and the result processed using a signal strength calculation 512 or algorithm to determine signal strength of quasi-sinusoidal signals (CC, CS, SC, SS). As in the embodiments described above the AGC signal derived from signal strength calculation 512 is coupled to a controller 514, which executes a signal gain adjustment algorithm and operates to adjust or modulate the integration time of the DIFF-TIAs 506, gain of an amplification stage 510, and/or intensity of illumination from an illuminator (not shown in this figure). When used in speckle based optical navigation sensors this embodiment has the added advantage of enabling the gain loop to respond to reduction in signals (CC, CS, SC, SS) from the array 504 due to fading of detected speckle spatial frequencies. In addition, the AGC signal derived from signal strength calculation 512 is not affected by the straylight, i.e., the light not reflected or scattered from a tracking surface, which may vary from part to part due to component placement tolerances.

The signal strength can be determined using a number of different calculations or algorithms including: (i) calculation of peak-to-peak amplitude; (ii) calculation of standard deviation; and (iii) calculation of an average of magnitudes squared of phasor vectors derived from the signals in logarithm scale (SIGLOG function) of the array.

Example embodiments of each of these different calculations or algorithms for determining signal strength from a comb-array in a speckle-based optical navigation sensor are described in detail below.

Consider a block of N sample frame pairs with $T_1$ and $T_2$ frame intervals from two sensor areas within an array (sensor1 and sensor2), each sample frame from each sensor area contains following signals output from the differential transimpedance amplifiers:

$$\{CC, CS, SC, SS\}_{k,t,s}$$

where sub-index "k" denotes the location of a frame pair within the block (k=1, 2 . . . N); sub-index "t" denotes the $T_1$ or $T_2$ frame interval within a frame pair (t=$T_1$ or $T_2$); and sub-index "s" indicates which sensor area the signals come from (s=sensor1, or sensor2). The corresponding in-phase (I) and quadrature (Q) signals for processing motion along two diagonal directions ("+" and "−" directions) can be derived as follows:

$$I_{+,k,t,s} = CC_{k,t,s} - SS_{k,t,s}$$

$$Q_{+,k,t,s} = CS_{k,t,s} + SC_{k,t,s}$$

$$I_{-,k,t,s} = CC_{k,t,s} + SS_{k,t,s}$$

$$Q_{-,k,t,s} = CS_{k,t,s} - SC_{k,t,s}$$

The block-averaged motion across $T_1$ frame interval along the two diagonal directions can be estimated from the phase angles of the following "b-vectors":

$$b_{+,x,T_1} = \frac{1}{2N}\sum_{k=1}^{N}\sum_{s=sensor1}^{sensor2}[I_{+,k,T_1} \times I_{+,(k-1),T_2} + Q_{+,k,T_1} \times Q_{+,(k-1),T_2}]_s$$

$$b_{+,y,T_1} = \frac{1}{2N}\sum_{k=1}^{N}\sum_{s=sensor1}^{sensor2}[Q_{+,k,T_1} \times I_{+,(k-1),T_2} - I_{+,k,T_1} \times Q_{+,(k-1),T_2}]_s$$

$$b_{-,x,T_1} = \frac{1}{2N}\sum_{k=1}^{N}\sum_{s=sensor1}^{sensor2}[I_{-,k,T_1} \times I_{-,(k-1),T_2} + Q_{-,k,T_1} \times Q_{-,(k-1),T_2}]_s$$

$$b_{-,y,T_1} = \frac{1}{2N}\sum_{k=1}^{N}\sum_{s=sensor1}^{sensor2}[Q_{-,k,T_1} \times I_{-,(k-1),T_2} - I_{-,k,T_1} \times Q_{-,(k-1),T_2}]_s$$

and the block-averaged motion across $T_2$ frame interval along the two diagonal directions can be estimated from the phase angles of the following "b-vectors":

$$b_{+,x,T_2} = \frac{1}{2N}\sum_{k=1}^{N}\sum_{s=sensor1}^{sensor2}[I_{+,k,T_2} \times I_{+,k,T_1} + Q_{+,k,T_2} \times Q_{+,k,T_1}]_s$$

$$b_{+,y,T_2} = \frac{1}{2N}\sum_{k=1}^{N}\sum_{s=sensor1}^{sensor2}[Q_{+,k,T_2} \times I_{+,k,T_1} - I_{+,k,T_2} \times Q_{+,k,T_1}]_s$$

-continued $$b_{-,x,T_2} = \frac{1}{2N}\sum_{k=1}^{N}\sum_{s=sensor1}^{sensor2} [I_{-,k,T_2} \times I_{-,k,T_1} + Q_{-,k,T_2} \times Q_{-,k,T_1}]_s$$

$$b_{-,y,T_2} = \frac{1}{2N}\sum_{k=1}^{N}\sum_{s=sensor1}^{sensor2} [Q_{-,k,T_2} \times I_{-,k,T_1} - I_{-,k,T_2} \times Q_{-,k,T_1}]_s$$

where the sub-index "x" and sub-index "y" denote the X and Y coordinates of the phasor diagram in which these "b-vectors" can be displayed; and "$b_x$" and "$b_y$" are the two components of a "b-vector" in the phasor diagram.

Thus, the peak-to-peak amplitude of the comb-array signals within a block of N sample frame pairs can be computed based on the following equation:

$$A_{pp} = \max \{I_{+,k,t,s}, Q_{+,k,t,s}, I_{-,k,t,s}, Q_{-,k,t,s}\}_{k=1,2,\ldots,N; t=T_1,T_2; s=sensor1,sensor2} - \min \{I_{+,k,t,s}, Q_{+,k,t,s}, I_{-,k,t,s}, Q_{-,k,t,s}\}_{k=1,2,\ldots,N; t=T_1,T_2; s=sensor1,sensor2}$$

Since these in-phase and quadrature signals are zero-mean, the standard deviation of the comb array signals within a block of N sample frame pairs can be calculated based on the following equation:

$$A_{stddev} = \sqrt{\frac{1}{8N}\sum_{k=1}^{N}\sum_{t=T_1}^{T_2}\sum_{s=sensor1}^{sensor2}\{(I_{+,k,t,s})^2 + (Q_{+,k,t,s})^2 + (I_{-,k,t,s})^2 + (Q_{-,k,t,s})^2\}}$$

and the comb array signal SIGLOG function is defined as the average of the magnitudes squared of the "b-vectors" mentioned above in logarithm scale:

$$SIGLOG = 4 \times LOG_2\left[\frac{1}{4}\sum_{t=T_1}^{T_2}\{(b_{+,x,t})^2 + (b_{+,y,t})^2 + (b_{-,x,t})^2 + (b_{-,y,t})^2\}\right]$$

An embodiment of the SIGLOG function calculation is to take separate averages of the magnitudes squared of the "b-vectors" for the two orthogonal directions ("+" and "−" directions), and then take the minimum of the two averages. The SIGLOG function is this minimum in logarithm scale:

$$SIGLOG = 4 \times LOG_2\left[MIN\left\{\frac{\sum_{t=T_1}^{T_2}(b_{+,x,t})^2 + (b_{+,y,t})^2}{2}, \frac{\sum_{t=T_1}^{T_2}(b_{-,x,t})^2 + (b_{-,y,t})^2}{2}\right\}\right]$$

Figure 6:
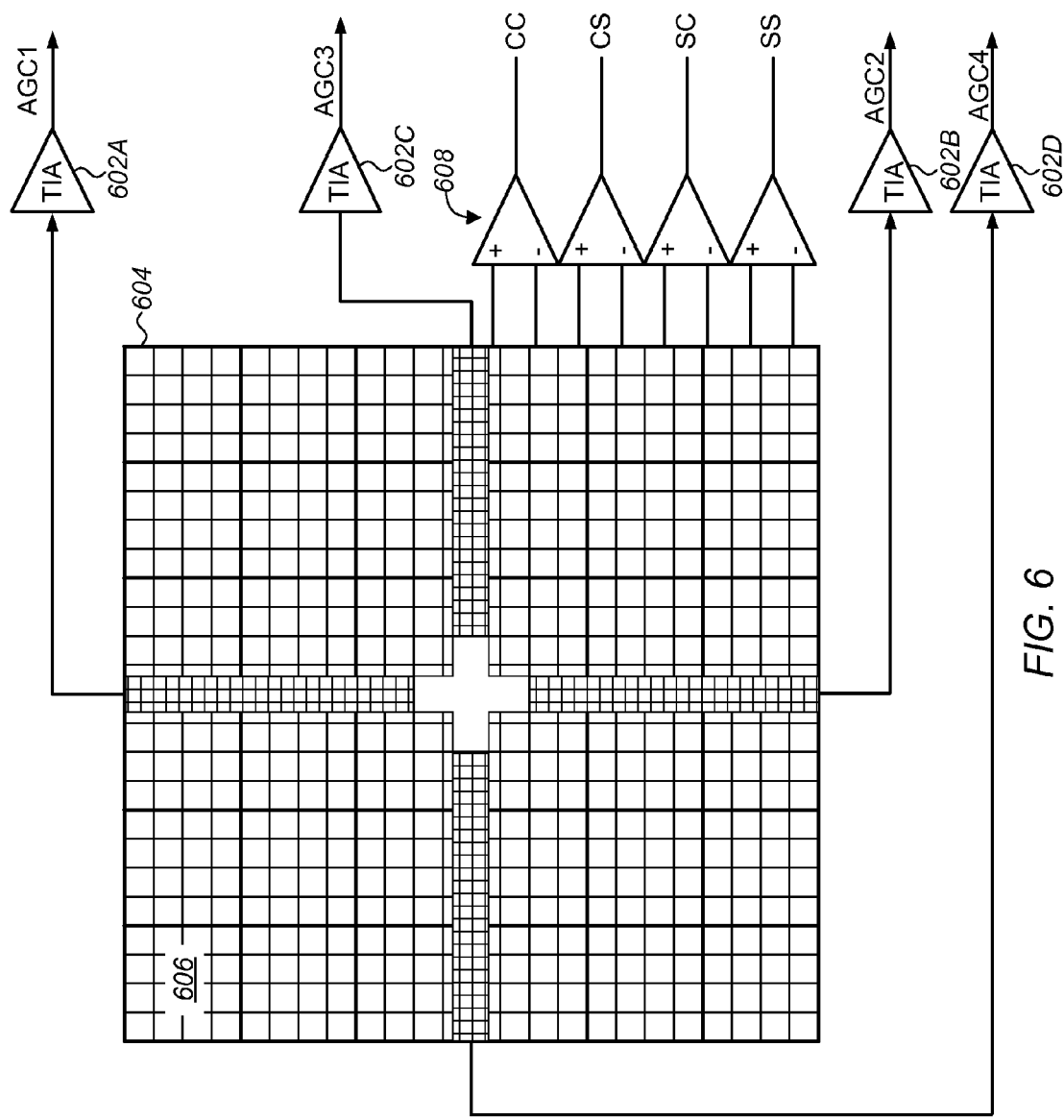
FIG. 6 is a schematic block diagram illustrating a plurality of TIAs of the gain control circuit, each coupled to a number of photo-detectors (PDs) located in different contiguous areas of the array.

In another embodiment, shown in FIG. 6, the gain control circuit includes multiple TIAs 602A through 602D, each comprising an input coupled to a number of PDs 604 located in a contiguous area of an array 606 different from PDs coupled to another of the TIAs. The controller (not shown in this figure) further includes logic to execute an algorithm or perform a calculation to determine a spatial distribution of an intensity or level of light across the array 606 using AGC signals (AGC1-AGC4) from the TIAs 602A-602D. Information on the spatial distribution of light level across the array 606 can be used, for example, to determine a height and/or angle between the array and a tracking surface relative to which it is displaced. This information or measurement can also be used to determine if the optical navigation sensor, and more particularly the array 606, is properly assembled within manufacturing tolerances into an input device, such as a computer mouse, in which it is included. The embodiment illustrated in FIG. 6 show a configuration in which four different single-ended TIAs 602A-602D are each coupled to multiple PDs 604 in the array 606 to determine the light level or beam position across the array. However, it will be appreciated that other configurations including a greater or lesser number of TIAs or PDs coupled to each TIA can also be used without departing from the scope of the present disclosure.

For example, in one embodiment the TIAs 602 can include a number of TIAs coupled to one or small number of PDs 604 located near a peripheral edge of the array 606 outside of the area normally illuminated by light originating from the system illuminator and reflected from a tracking surface. These TIAs 602 coupled to PDs 604 near the edge of the array 606 can be used primarily or solely for determining a photocurrent due to stray light, i.e., light not reflected from a tracking surface, which can then be subtracted from a signal out of the TIAs 602 or DIFF_AMPs 608 to improve accuracy of the of the gain control circuit or optical navigation sensor. The TIAs 602 may include a number of TIAs coupled to one or small number of PDs 604 located near a center of the array 606 so the accuracy of the AGC signal derived from the outputs of the TIAs is less susceptible to component placement tolerances in assembly as well as changes in illuminator beam spot size.

In the description, for purposes of explanation, numerous specific details have been set forth in order to provide a thorough understanding of the control system and method of the present disclosure. It will be evident; however, to one skilled in the art that the present control system and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the control system or method. The appearances of the phrase "one embodiment" in various places in the specification do not necessarily all refer to the same embodiment. The term "to couple" as used herein may include both to directly connect and to indirectly connect through one or more intervening components.

The foregoing description of specific embodiments and examples have been presented for the purpose of illustration and description, and although described and illustrated by certain of the preceding examples, the signal monitoring method and control system disclosed herein are not to be construed as being limited thereby. They are not intended to be exhaustive or to limit the control system and method to the precise forms disclosed, and many modifications, improvements and variations within the scope of the disclosure are possible in light of the above teaching.

What is claimed is:

1. A method of operating an optical navigation sensor comprising:
   receiving a current signal from an automatic gain control (AGC) photo-detector and generating an AGC signal in response thereto;
   generating an illumination control signal in response to the AGC signal; and coupling the illumination control signal to an illuminator configured to illuminate at least a portion of an array of photo-detectors with light reflected from a surface to sense displacement of the optical navigation sensor relative to a surface, and adjusting illumination from the illuminator.

2. The method of claim 1 wherein the optical navigation sensor further comprises transimpedance-amplifiers each including an input coupled photo-detectors in the array of photo-detectors to receive current signals therefrom and an output to output a voltage signal generated in response thereto, and further comprising generating an integration time control signal in response to the AGC signal to adjust an integration time of the transimpedance-amplifiers over which the received current signals are integrated to generate the voltage signal.

3. The method of claim 2 wherein the optical navigation sensor further comprises gain amplifiers coupled to the outputs of the transimpedance-amplifiers, and further comprising generating an amplifier gain control signal in response to the AGC signal to adjust gain of the gain amplifiers.

4. The method of claim 3 wherein the optical navigation sensor further comprises a controller coupled to the AGC photo-detector, and wherein generating the illumination control signal, the integration time control signal and the amplifier gain control signal comprises executing in the controller a signal gain adjustment algorithm to generate the illumination control signal, the integration time control signal and the amplifier gain control signal in response to the AGC signal.

5. The method of claim 2 wherein the AGC photo-detector comprises a photo-detector in the array of photo-detectors.

6. The method of claim 5 wherein generating the AGC signal comprises integrating with one of the transimpedance-amplifiers the current signal received from the AGC photo-detector.

7. The method of claim 2 wherein the transimpedance-amplifiers comprise differential transimpedance-amplifiers.

8. The method of claim 1 wherein the AGC photo-detector comprises a photo-detector proximal to and independent of the array of photo-detectors.

9. The method of claim 1 wherein generating the AGC signal comprises integrating with a single ended transimpedance-amplifier the current signal received from the AGC photo-detector.

10. A method of operating an optical navigation sensor comprising:
receiving a current signal from an automatic gain control (AGC) photo-detector and generating an AGC signal in response thereto;
generating an integration time control signal in response to the AGC signal;
coupling the integration time control signal to transimpedance-amplifiers each including an input coupled photo-detectors in an array of photo-detectors to receive current signals therefrom and an output to output a voltage signal generated in response thereto; and
adjusting an integration time of the transimpedance-amplifiers over which the received current signals are integrated to generate the voltage signal.

11. The method of claim 10 wherein the AGC photo-detector comprises a photo-detector in the array of photo-detectors.

12. The method of claim 11 wherein generating the AGC signal comprises integrating with one of the transimpedance-amplifiers the current signal received from the AGC photo-detector.

13. The method of claim 10 wherein the transimpedance-amplifiers comprise differential transimpedance-amplifiers.

14. The method of claim 10 wherein the AGC photo-detector comprises a photo-detector proximal to and independent of the array of photo-detectors.

15. The method of claim 10 wherein generating the AGC signal comprises integrating with a single ended transimpedance-amplifier the current signal received from the AGC photo-detector.

16. The method of claim 10 wherein the optical navigation sensor further comprises a controller coupled to the AGC photo-detector, and wherein generating the integration time control signal comprises executing in the controller a signal gain adjustment algorithm to generate the integration time control signal in response to the AGC signal.

17. The method of claim 10 wherein the optical navigation sensor further comprises gain amplifiers coupled to the outputs of the transimpedance-amplifiers, and further comprising generating an amplifier gain control signal in response to the AGC signal to adjust gain of the gain amplifiers.

18. A method of operating an optical navigation sensor comprising:
illuminating at least a portion of an array of photo-detectors with light reflected from a surface;
receiving in a plurality of a transimpedance-amplifiers current signals from the array of photo-detectors, each of the plurality of transimpedance-amplifiers including an input coupled to a number of photo-detectors located in a contiguous area of the array different from photo-detectors coupled to another of the plurality of transimpedance-amplifiers;
generating from each transimpedance-amplifier an automatic gain control (AGC) signal in response to current signals received from the array of photo-detectors; and
determining a spatial distribution of illumination level across the array of photo-detectors using AGC signals from the plurality of transimpedance-amplifiers.

19. The method of claim 18 further comprising generating each trans impedance-amplifier an integration time control signal in response to the AGC signal coupling the integration time control signal to the transimpedance-amplifier, and adjusting an integration time of the transimpedance-amplifier over which current signals received from the array of photo-detectors are integrated.

20. The method of claim 18 wherein the optical navigation sensor further comprises a controller coupled to the plurality of transimpedance-amplifiers, and wherein the controller includes logic to spatial distribution of illumination level across the array of photo-detectors using AGC signals from the plurality of transimpedance-amplifiers.

* * * * *